United States Patent
Wood et al.

(10) Patent No.: US 10,990,750 B2
(45) Date of Patent: Apr. 27, 2021

(54) DYNAMICALLY BUNDLING WEB PAGE RESOURCES

(71) Applicant: INTERNATIONAL BUSINESS MACHINES CORPORATION, Armonk, NY (US)

(72) Inventors: John J. Wood, St. Albans (GB); Giacomo G. Chiarella, Eastleigh (GB); Eunjin Lee, Eastleigh (GB); Daniel T. Cunnington, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 16/197,991

(22) Filed: Nov. 21, 2018

(65) Prior Publication Data

US 2020/0159817 A1    May 21, 2020

(51) Int. Cl.
*G06F 16/957* (2019.01)
*G06F 40/14* (2020.01)
*G06F 16/958* (2019.01)

(52) U.S. Cl.
CPC ............ *G06F 40/14* (2020.01); *G06F 16/972* (2019.01); *G06F 16/986* (2019.01)

(58) Field of Classification Search
CPC .......... G06F 17/90; G06F 16/20; G06F 16/30; G06F 17/20; G06F 17/30; G06F 3/048; G06F 16/90; G06F 40/10; G06F 3/04; G06F 40/14; G06F 16/972; G06F 16/986; G06F 16/9574
See application file for complete search history.

(56) References Cited

U.S. PATENT DOCUMENTS

| | | | |
|---|---|---|---|
| 8,413,046 B1 | 4/2013 | Mocanu | |
| 8,924,850 B1 | 12/2014 | Ramani et al. | |
| 9,384,711 B2 | 7/2016 | Ergan et al. | |
| 2012/0066586 A1 | 3/2012 | Shemesh | |
| 2013/0138767 A1* | 5/2013 | Vecera | G06F 16/95 709/217 |

(Continued)

OTHER PUBLICATIONS

Github, "Guess.js: Libraries and Tools for Enabling Data-Driven User-Experiences on the Web", [online], [retrieved on Nov. 5, 2018], retrieved from the Internet at <URL: https://github.com/guess-js/guess>, 8 pp.

*Primary Examiner* — Sanchita Roy
(74) *Attorney, Agent, or Firm* — Konrad Raynes Davda & Victor LLP; Janaki K. Davda

(57) ABSTRACT

Provided are techniques for dynamically bundling web page resources. A request for web page resources is received in response to a web page being downloaded at a connection speed. In response to determining that the web page performance data is stored and determining that a resource loading issue indicator in the web page performance data indicates one of that the web page has a resource loading issue and that the resource loading issue indicator is not set, the web page resources are retrieved to form a bundle of web page resources. The web page is displayed using the bundle of web page resources. In response to determining that the web page performance data is not stored, the web page performance data is stored for use in determining whether to bundle web page resources for a subsequent request of the web page at the connection speed.

18 Claims, 7 Drawing Sheets

(56) References Cited

U.S. PATENT DOCUMENTS

| | | | |
|---|---|---|---|
| 2013/0227078 A1* | 8/2013 | Wei | H04L 67/2871 |
| | | | 709/219 |
| 2013/0297561 A1* | 11/2013 | Mizrotsky | G06F 16/245 |
| | | | 707/609 |
| 2014/0026034 A1* | 1/2014 | Harrison | G06F 16/957 |
| | | | 715/234 |
| 2016/0344832 A1* | 11/2016 | Kukreja | H04L 67/2833 |
| 2018/0052811 A1 | 2/2018 | Gonzalez del Solar et al. | |
| 2018/0067909 A1 | 3/2018 | Wei et al. | |

* cited by examiner

| Web Page Performance Data 140 | | | | | |
|---|---|---|---|---|---|
| Web Page Identifier | Connection Speed | System Settings | Web Page Resource Data | Loading Time | Resource Loading Issue Indicator |
|  |  |  |  |  |  |

FIG. 2

DYNAMICALLY BUNDLING WEB PAGE RESOURCES

BACKGROUND

1. Field of the Invention

Embodiments of the invention relate to dynamically bundling web page resources when a web page of a website is re-rendering soon after an initial load.

2. Description of the Related Art

A website may be described as having one or more web pages. When a website is accessed, by a user using a browser of a computer, a web page of that website is displayed in the browser. Web page resources may be described as any resource that is used for a web page to operate (e.g., HyperText Markup Language (HTML), a JavaScript® file, Cascading Style Sheet (CSS) files, images etc.). (JavaScript is a registered trademark of Oracle Corporation in the United States and/or other countries.)

In some cases, when a web page that requires a large number of web page resources loads, or when the browser is on a slow connection, the initial load of the web page is slow and parts of the web page are re-rendered multiple times as style sheets and other web page resources are loaded.

SUMMARY

In accordance with embodiments, a computer-implemented method is provided for dynamically bundling web page resources. The computer-implemented method performs operations. A request for web page resources is received in response to a web page being downloaded at a connection speed. It is determined whether web page performance data is stored for the web page and for the connection speed. In response to determining that the web page performance data is stored and determining that a resource loading issue indicator in the web page performance data indicates one of that the web page has a resource loading issue and that the resource loading issue indicator is not set, the web page resources are retrieved to form a bundle of web page resources. The web page is displayed using the bundle of web page resources. In response to determining that the web page performance data is not stored, the web page performance data is stored for use in determining whether to bundle web page resources for a subsequent request of the web page at the connection speed.

In accordance with other embodiments, a computer program product is provided for dynamically bundling web page resources. The computer program product comprising a computer readable storage medium having program code embodied therewith, the program code executable by at least one processor to perform operations. A request for web page resources is received in response to a web page being downloaded at a connection speed. It is determined whether web page performance data is stored for the web page and for the connection speed. In response to determining that the web page performance data is stored and determining that a resource loading issue indicator in the web page performance data indicates one of that the web page has a resource loading issue and that the resource loading issue indicator is not set, the web page resources are retrieved to form a bundle of web page resources. The web page is displayed using the bundle of web page resources. In response to determining that the web page performance data is not stored, the web page performance data is stored for use in determining whether to bundle web page resources for a subsequent request of the web page at the connection speed.

In yet other embodiments, a computer system is provided for dynamically bundling web page resources. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A request for web page resources is received in response to a web page being downloaded at a connection speed. It is determined whether web page performance data is stored for the web page and for the connection speed. In response to determining that the web page performance data is stored and determining that a resource loading issue indicator in the web page performance data indicates one of that the web page has a resource loading issue and that the resource loading issue indicator is not set, the web page resources are retrieved to form a bundle of web page resources. The web page is displayed using the bundle of web page resources. In response to determining that the web page performance data is not stored, the web page performance data is stored for use in determining whether to bundle web page resources for a subsequent request of the web page at the connection speed.

BRIEF DESCRIPTION OF THE SEVERAL VIEWS OF THE DRAWINGS

Referring now to the drawings in which like reference numbers represent corresponding parts throughout:

FIG. 2 illustrates details of web page performance data in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Re-rendering in conventional systems may be annoying for a user because the user does not know when a web page is ready to interact with. Such re-rendering may also be a jarring user experience when pages re-render themselves so soon after loading. Also, with the web page re-rendering, the user may interact with parts of the web page that the user did not intend to select.

Embodiments avoid the problems of re-rendering by dynamically and automatically bundling web page resources.

Figure 1:
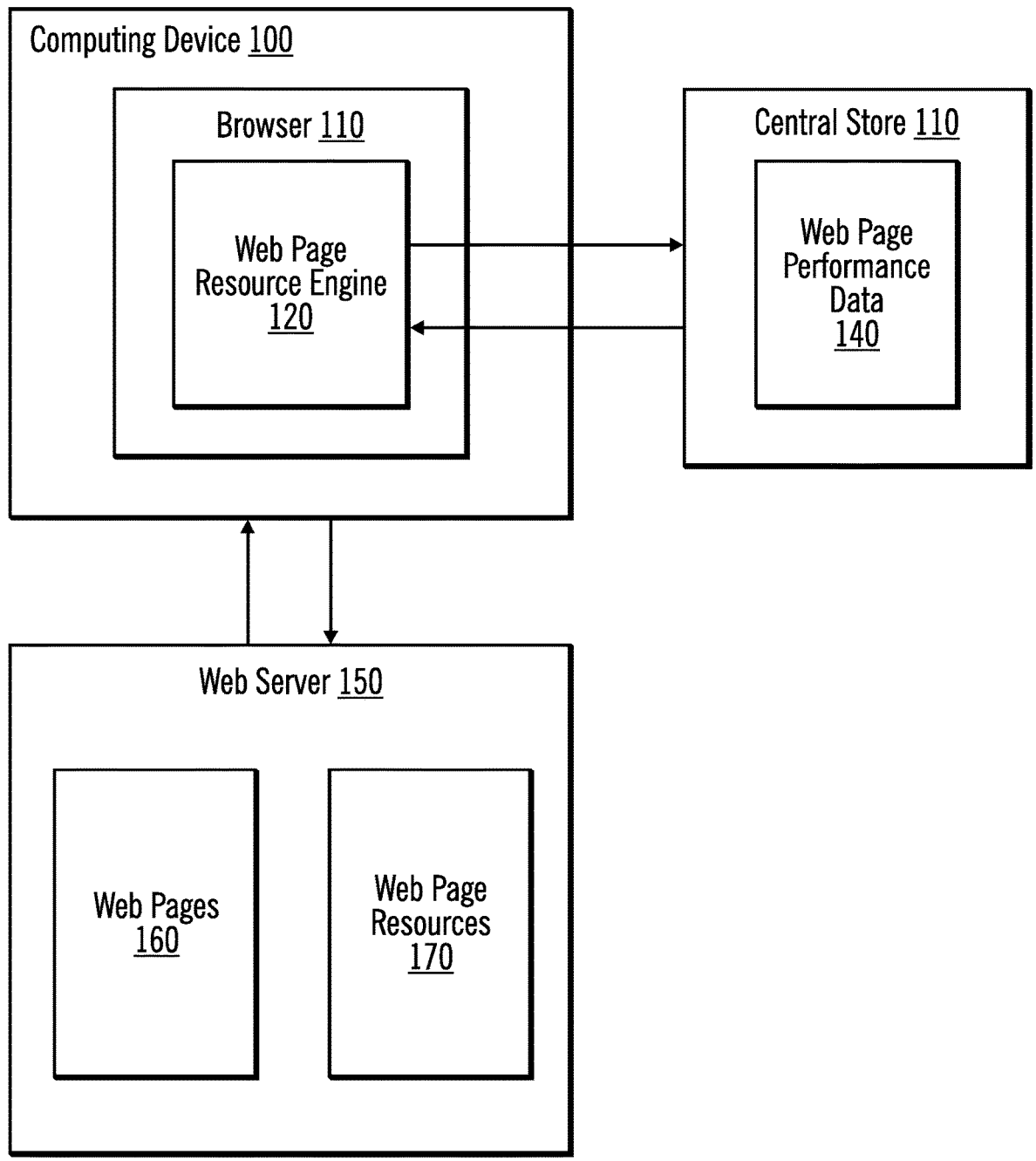
FIG. 1 illustrates, in a block diagram, a computing environment in accordance with certain embodiments.

FIG. 1 illustrates, in a block diagram, a computing environment in accordance with certain embodiments. A computing device 100 includes a browser 110. The browser 110 includes a web page resource engine 120. The computing device 100 is connected to a central store 130 that stores web page performance data 140.

The computing device 100 is connected to a web server 150 via a network (such as the Internet). The web server 150 stores web pages 160 and web page resources 170.

The web page resource engine 120 monitors web page performance, including web page resource load times, memory performance, active page manipulations, web page resources, and time spent rendering updates (e.g., styling or font loading). Then, the web page resource engine 120 stores this as the web page performance data 140. When a web page of a website is subsequently downloaded into the browser 110, the web page resource engine 120 uses the web page performance data 140 to determine whether to bundle the web page resources. In certain embodiments, bundling the web page resources refers to obtaining the web page resources to display a web page before the web page is displayed. In certain embodiments, if the web page resources are bundled, there may be a delay in displaying the web page of the website.

The web page resource engine 120 provides an improved User Interface (UI) experience for the end users of a web page of a website. With embodiments, for any web page that causes multiple rendering updates to the web page soon after initially rendering the web page, the web page resource engine 120 hides the web page from the user until the rendering is complete so that the end user does not see the multiple web page re-renderings. In certain embodiments, the web page resource engine 120 delays display of the web page, and, during this time, an indication that the web page is downloading may be provided.

This is advantageous because it is not dependent on developers, and is something end-users can install as an application or extension on an existing browser.

Merely to enhance understanding of embodiments, an example is provided. In this example, a user accesses a web page of a website through a browser, and the browser downloads an initial web page resource called "bundle1" for the web page. Once "bundle1" has been downloaded, "bundle1" performs some prerequisite checks on the browser to determine what the browser supports. Then, "bundle1" knows which files (i.e., other web page resources) to import for that browser and fetches these other files. The other files may be fetched with multiple requests (e.g., first polyfill files and then other files). Since the web page resource engine 120 has already loaded "bundle1", the browser may be displaying the rendered, initial web page.

Depending on how the web page has been configured, more parts of the web page may be rendered or re-rendered as more files are imported via the requests. In some cases, the designer/developer of the web page has ensured that the web page does not render until the multiple web page resources for that web page have been loaded in the correct order. However, this is not always the case and leads to the user experience of the page changing quickly as it loads and re-loads. Embodiments fix this resource loading issue (which may be referred to as a web page resource loading issue). In certain embodiments, this is particularly apparent if the relevant style-sheets for the web page are loaded on demand, and, thus, the default browser style-sheets are used initially.

The web page resource engine 120 provides a solution to the resource loading issue that maintains the current flexibility of web page resource loading. To do this, the web page resource engine 120 of the browser stores the web page performance data 140 about web pages in the central store 130. The web page performance data 140 includes, but is not limited to:

loading time of the web page web page resource data including: how soon after web page resources are loaded does the web page re-render, whether this process occurs multiple times, and additional performance statistics (e.g., web page resource load times, memory performance, active page manipulations, web page resources, and time spent rendering updates (e.g., styling or font loading)

system settings (e.g., browser version, connection speeds, etc.)

FIG. 2 illustrates details of the web page performance data 140 in accordance with certain embodiments. In certain embodiments, the web page performance data 140 is stored in table 200, which has columns for: a web page identifier (to identify a web page of a website), a connection speed (which may be a separate column from or included in the system settings column), system settings (e.g., of the browser displaying the web page), web page resource data, loading time of the web page, and a resource loading issue indicator (e.g., a flag that is set to indicate either that this web page has a resource loading issue (e.g., with a first value), does not have a resource loading issue (e.g., with a second value) or has not been set yet (e.g., with a third value)). In certain embodiments, a web page is listed multiple rows to reflect different information (e.g., different connection speeds) for that web page. In certain alternative embodiments, there are additional columns, such as to identify the website that the web page is a part of In certain embodiments, the web page performance data 140 or the central store 110 stores information on which web page resources are to be loaded for each web page.

A connection speed may be described as the speed that data is transferred from the web server 150 to the computing device 100 via a network (e.g., the Internet). The connection speed may also be referred to as bandwidth (e.g., bytes per second that data travels).

In certain embodiments, once the web page performance data 140 has been captured, when a user requests a web page, the web page resource engine 120 of the browser first looks up the web page performance data 140 about the web page based on, for example, the web page identifier and the connection speed of the user's computer. If the resource loading issue indicator indicates that there is a resource loading issue, then, the web page resource engine 120 bundles web page resources. If the resource loading issue indicator is not available (e.g., this is the first time that the web page has been downloaded), then the web page resource engine 120 infers whether the user is likely to experience a jarring user experience based on the other web page performance data 140.

In certain embodiments, the web page resource engine 120 defines the web page as having a resource loading issue based on one or more criteria. One criterion for defining the web page as having the resource loading issue may be that the web page re-renders quickly after the initial load (e.g., re-rendering occurs between 0.5 seconds-5 seconds after the initial load). This re-rendering criterion may be defined with a lower limit and an upper limit, where the lower limit is defined such that re-rendering times below this limit are unlikely to be noticed by the user, and where the upper limit is defined such that beyond the upper limit, re-rendering cannot be attributed to resource loading issues and web page resources are not bundled. This re-rendering criterion is user configurable. In certain embodiments, the re-rendering criterion covers fonts changing, images loading, advertisements loading, text moving position on the screen, etc. In certain embodiments, another criterion may be that a web page of a website is pre-tagged (e.g., by the developer) as having resource loading issues.

When the web page resource engine 120 of the browser 110 detects that there is a resource loading issue, instead of fetching the web page resources for the web-page with multiple requests, the web page resource engine 120 bundles the web page resources together in one package with one or more requests. Then, when the multiple web page resources (e.g., files) are downloaded, the web page resource engine 120 provides the bundled web page resources to the browser at one time. The browser may then render the web page, without performing any re-rendering as all the web page resources are available. Thus, when there are multiple requests for the multiple web page resources, the request latency is removed as the web page resources are already available and have been loaded by the web page resource engine 120. This alleviates resource loading issues and ensures a good user experience without the developer/designer of the web page having to deploy an updated web page.

Furthermore, if the web page resource engine 120 of the browser 110 has detected a resource loading issue and thus bundled web page resources in an attempt to alleviate the issue, the web page resource engine 120 then confirms that it has fixed the issue. If it has not fixed the issue, then, the web page resource engine 120 flags re-rendering issues for that web page and for that connection speed as not based on web page resource loading and thus stops bundling web page resources of this web page for the connection speed in future.

Embodiments do not increase/change load times of the web page that has the same web page resources that would have been requested without the web page resource engine 120. Instead, the web page resource engine 120 delays display of the web page (i.e., makes the web page wait for all its relevant web page resources to be fetched before it begins processing the web page to stop immediate re-renders).

Also, embodiments do not interfere with only fetching some web page resources based on system checks, because the central store 130 knows which web page resources are going to be fetched based on connection speed and system settings. In certain embodiments, different browsers may have different support for various features (e.g., fonts are not the same across browsers and have different fallback fonts, which may depend on the Operating System being used).

Figure 3A:
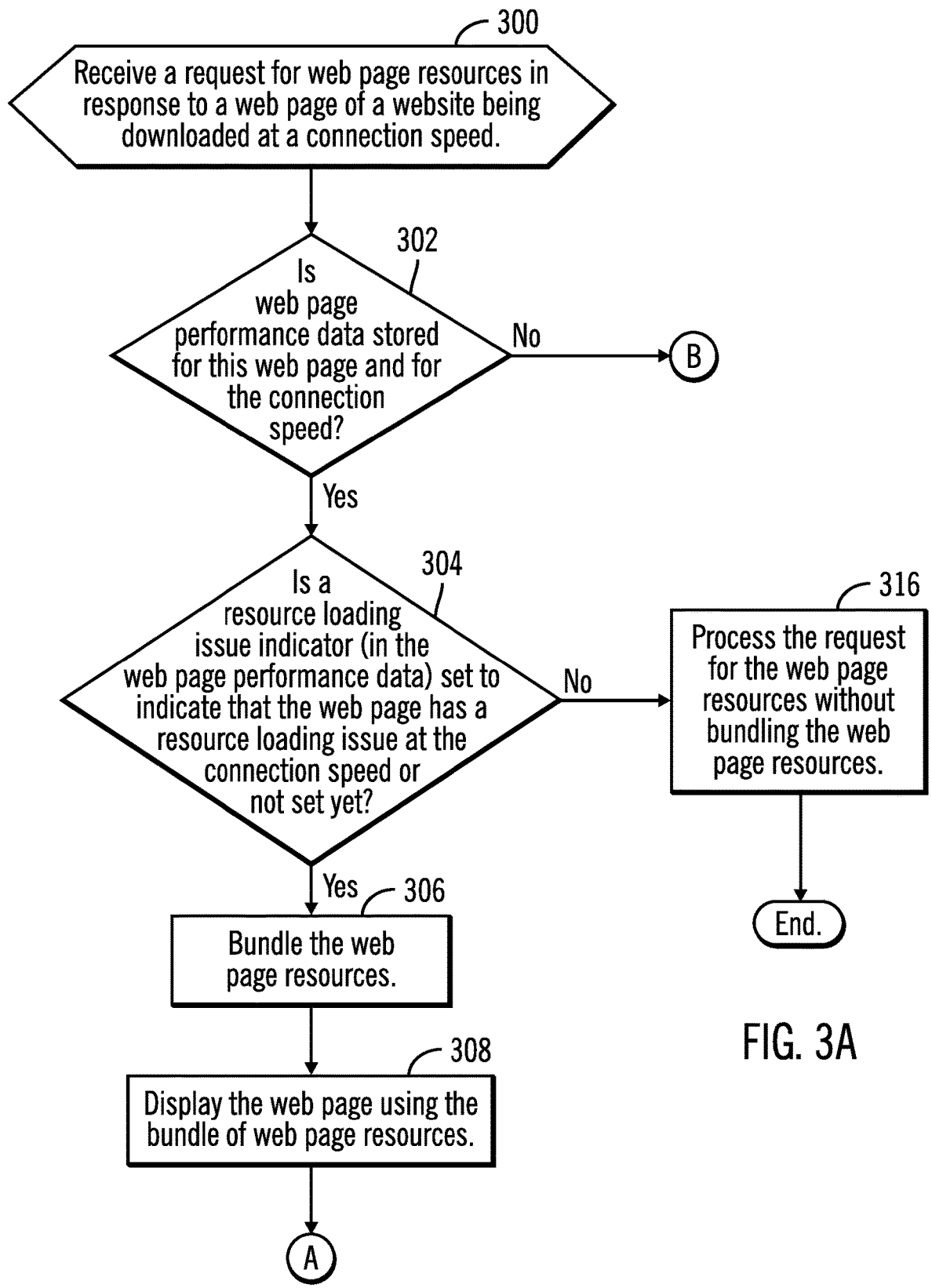
FIGS. 3A, 3B, and 3C illustrate, in a flowchart, operations for determining whether to bundle web page resources in accordance with certain embodiments.
Figure 3B:
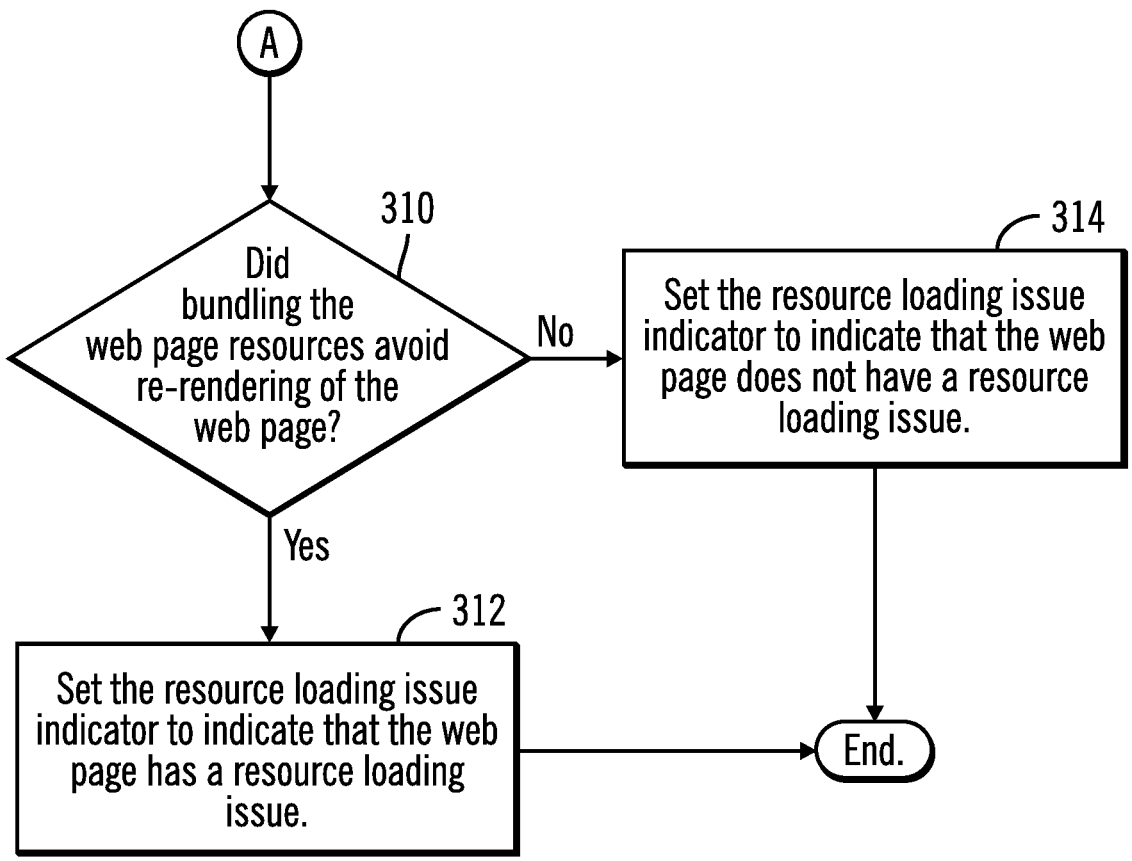
Figure 3C:
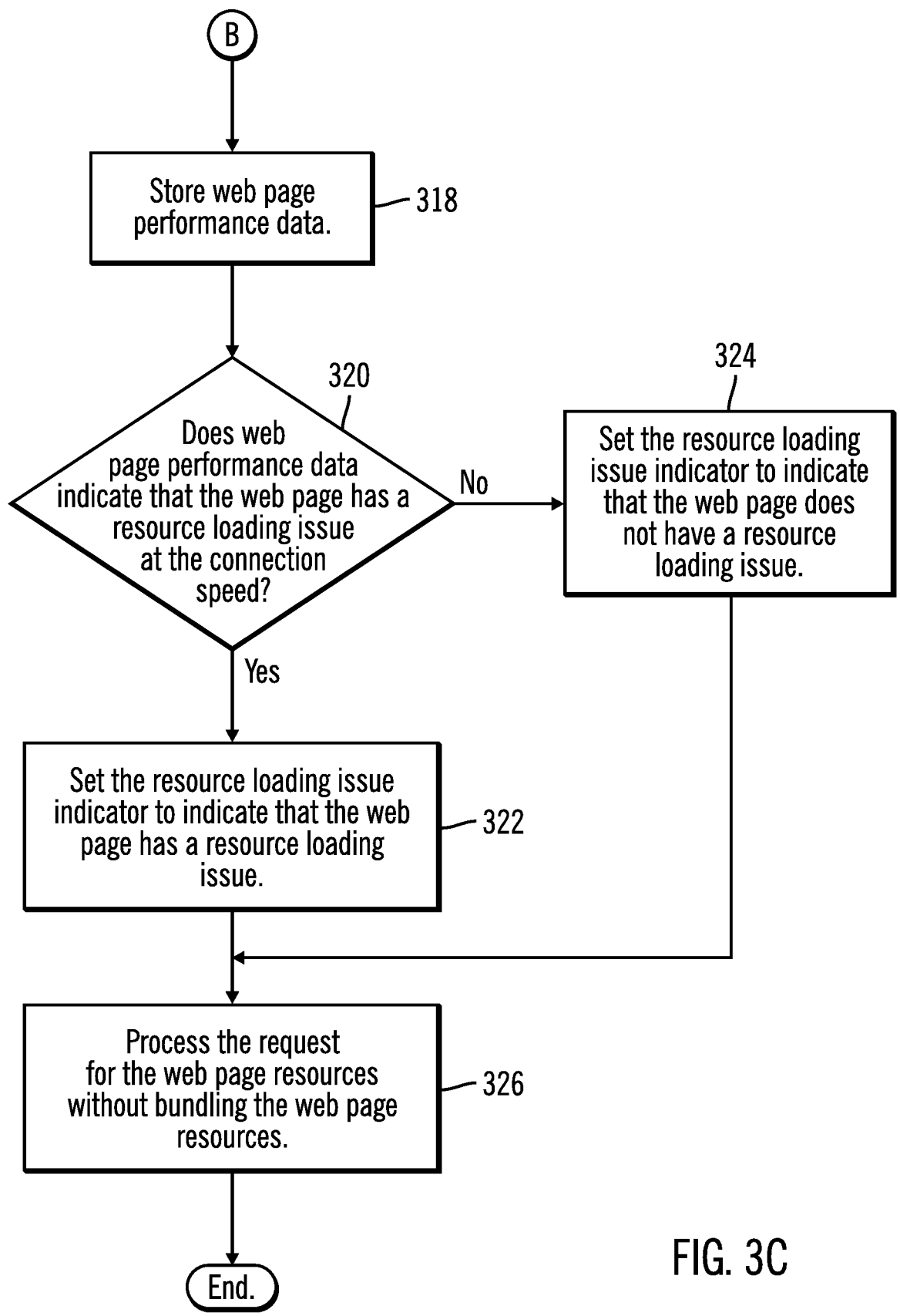

FIGS. 3A, 3B, and 3C illustrate, in a flow chart, operations for determining whether to bundle web page resources in accordance with certain embodiments. Control begins at block 300 with the web page resource engine 120 of the browser 110 receiving a request for web page resources in response to a web page of the website being downloaded at a connection speed. In certain embodiments, the central store 130 stores an indication of which web page resources are to be downloaded for each web page. In certain alternative embodiments, an initial web page resource is downloaded that indicates other web page resources to be downloaded.

In block 302, the web page resource engine 120 determines whether web page performance data 140 is stored for this web page and for the connection speed. If so, processing continues to block 304, otherwise, processing continues to block 318 (FIG. 3C).

In block 304, the web page resource engine 120 determines whether a resource loading issue indicator in the web page performance data is set to indicate that the web page has a resource loading issue for the connection speed or is not set yet (e.g., the first time the web page is downloaded at the connection speed, the resource loading issue indicator has not been set yet). If so, processing continues to block 306, otherwise, processing continues to block 316.

In block 306, the web page resource engine 120 bundles the web page resources. In block 308, the browser 110 displays the web page using the bundle of web page resources. In certain embodiments, the web page resource engine 120 returns the web page resources to the browser 110 as a bundle for use in displaying the web page. From block 308 (FIG. 3A), processing continues to block 310 (FIG. 3B).

In block 310, the web page resource engine 120 determines whether bundling the web page resources avoided re-rendering of the web page (i.e., alleviates resource loading issues). If so, processing continues to block 312, otherwise, processing continues to block 314. In certain embodiments, the web page resource engine 120 monitors the display of the web page to determine whether re-rendering occurred (e.g., in a short amount of time).

In block 312, the web page resource engine 120 sets the resource loading issue indicator to indicate that the web page has a resource loading issue. This may be described as logging the web page as having a resource loading issue at a particular connection speed. That is, the web page resource engine 120 avoided re-rendering by bundling and loading the web page resources. When the web page is logged as having a resource loading issue, for subsequent requests of the web page at the connection speed, in block 304, the web page resource engine 120 determines that the web page has a resource loading issue and bundles the web page resources.

In block 314, the web page resource engine 120 sets the resource loading issue indicator to indicate that the web page does not have a resource loading issue. This may be described as logging the web page as not having a resource loading issue at the particular connection speed. That is, the web page resource engine 120 logs re-rendering as not being a resource loading issue so that the web page resources are not bundled in future.

In block 316, the web page resource engine 120 processes the request for the web page resources without bundling web page resources (i.e., normal processing). This occurs because it is determined that the resource loading issue indicator is set to indicate that the web page does not have a resource loading issue (in block 304). This may result in the web page being re-rendered as the web page resources are downloaded separately (rather than in one bundle) and applied to display the web page.

In block 318, the web page resource engine 120 stores web page performance data (e.g., web page loading speed and web page resources requested as a function of connection speed). In block 320, the web page resource engine 120 determines whether the web page performance data indicates that the web page has a resource loading issue at the connection speed. If so, processing continues to block 322, otherwise, processing continues to block 324.

In block 322, the web page resource engine 120 sets the resource loading issue indicator to indicate that the web page has a resource loading issue. This may be described as logging the web page as having a resource loading issue at a particular connection speed. When the web page is logged as having a resource loading issue, for subsequent requests of the web page at the connection speed, in block 304, the web page resource engine 120 determines that the web page has a resource loading issue and bundles the web page resources.

In block 324, the web page resource engine 120 sets the resource loading issue indicator to indicate that the web page does not have a resource loading issue. This may be described as logging the web page as not having a resource loading issue at the particular connection speed. That is, the web page resource engine 120 logs re-rendering as not being a resource loading issue so that the web page resources are not bundled in future.

From block 322 or block 324, processing continues to block 326. In block 326, the web page resource engine 120 processes the request for the web page resources without bundling web page resources (i.e., normal processing). This may result in the web page being re-rendered as the web page resources are downloaded separately (rather than in one bundle) and applied to display the web page.

Because the web page resource engine 120 is part of the browser 110, the operations of FIGS. 3A, 3B, and 3C may be said to be performed by the browser 110.

In certain embodiments, the processing of blocks 310, 312, and 318 may result in changing the resource loading issue indicator even if the resource loading issue indicator had indicated that there was a resource loading issue for the web page at the connection speed (in block 304) (e.g., due to changes in the web page since it was last downloaded and the resource loading issue indicator was last set).

In certain embodiments, the web page resources for each web page of a website may be bundled and the operations of FIGS. 3A, 3B, and 3C occurs for each web page that is downloaded. In other embodiments, the web page resources of all web pages of the website may be bundled at one time when a web page of the website is downloaded.

Figure 4:
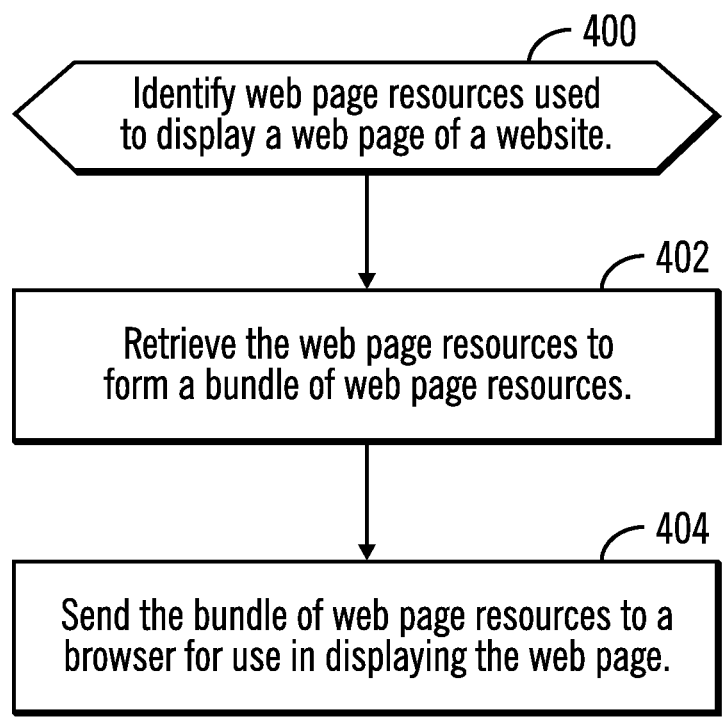
FIG. 4 illustrates, in a flowchart, operations for bundling web page resources in accordance with certain embodiments.

FIG. 4 illustrates, in a flowchart, operations for bundling web page resources in accordance with certain embodiments. Control begins at block 400 with the web page resource engine 120 identifying web page resources used to display a web page of the website. In block 402, the web page resource engine 120 retrieves the web page resources to form a bundle of web page resources. In block 404, the web page resource engine 120 sends the bundle of web page resources to a browser for use in displaying the web page. Thus, the web page resource engine 120 may be said to display, via the browser, the web page using the bundle of web page resources.

Thus, embodiments provide a web page in a browser by: in response to a first request for the web page, identifying the web page and the web page resources associated with the web page, loading a first web page resource of the web page, and identifying characteristics of the browser and the rendering of the loading of the first web page resource. Then, in response to identifying an issue with the rendering of the webpage, files for the web pages resources are fetched and bundled. In response to the bundling, the web page is displayed. Then, in response to a second request to load the web page, the web page resources are bundled before the web page of the web page is displayed.

Embodiments monitor web page performance, specifically monitoring multiple re-renders caused during/after initial web page resource loading. If embodiments detect that multiple requests are causing a jarring re-rendering of a web page, embodiments store this information. Then, when the web page is accessed subsequently (e.g., by the same or other users), embodiments bundle the web page resources in these requests into a single bundle before they are served to the browser so that they are served simultaneously.

Embodiments delay the render of the web page by ensuring that relevant web page resources are fetched before providing them to the browser. Embodiments bundle web page resources together based on user experience and wait for the web page resources within a bundle to be returned so that they are simultaneously served to the browser. Embodiments dynamically bundle web page resources together (as opposed to static predefined bundles) based on web page rendering performance.

Embodiments characterize page rendering performance around web page resource loading and wait for the web page resources associated with the poor performance to be loaded together before serving them to the browser. Embodiments communicate with the central store to access the web page performance data to determine whether a web page has been identified as having a resource loading issue. Embodiments update the central store with information regarding the outcome of the bundling process (either whether bundling avoided a jarring re-render or not).

Figure 5:
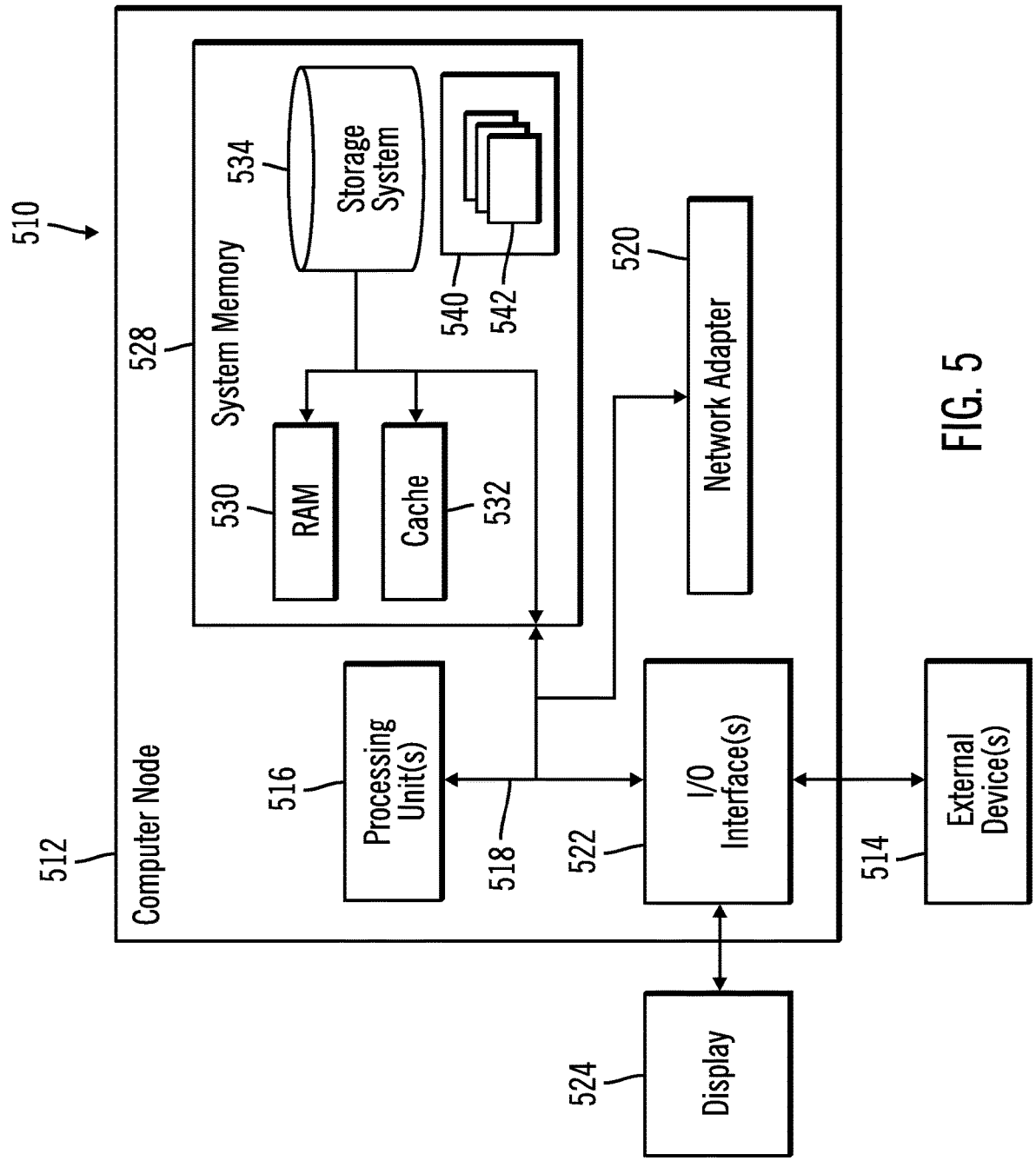
FIG. 5 illustrates a computing node in accordance with certain embodiments.

FIG. 5 illustrates a computing environment 510 in accordance with certain embodiments. Referring to FIG. 5, computer node 512 is only one example of a suitable computing node and is not intended to suggest any limitation as to the scope of use or functionality of embodiments of the invention described herein. Regardless, computer node 512 is capable of being implemented and/or performing any of the functionality set forth hereinabove.

The computer node 512 may be a computer system, which is operational with numerous other general purpose or special purpose computing system environments or configurations. Examples of well-known computing systems, environments, and/or configurations that may be suitable for use with computer node 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 512 may be described in the general context of computer system executable instructions, such as program modules, being executed by a computer system. Generally, program modules may include routines, programs, objects, components, logic, data structures, and so on that perform particular tasks or implement particular abstract data types. Computer node 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer node 512 is shown in the form of a general-purpose computing device. The components of computer node 512 may include, but are not limited to, one or more processors or processing units 516, a system memory 528, and a bus 518 that couples various system components including system memory 528 to one or more processors or processing units 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 512 typically includes a variety of computer system readable media. Such media may be any available media that is accessible by computer node 512, and it includes both volatile and non-volatile media, removable and non-removable media.

System memory 528 can include computer system readable media in the form of volatile memory, such as random access memory (RAM) 530 and/or cache memory 532. Computer node 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, system memory 528 may include at least one program product having a set (e.g., at least one) of program modules that are configured to carry out the functions of embodiments of the invention.

Program/utility 540, having a set (at least one) of program modules 542, may be stored in system memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer node 512 may also communicate with one or more external devices 514 such as a keyboard, a pointing device, a display 524, etc.; one or more devices that enable a user to interact with computer node 512; and/or any devices (e.g., network card, modem, etc.) that enable computer node 512 to communicate with one or more other computing devices. Such communication can occur via Input/Output (I/O) interfaces 522. Still yet, computer node 512 can communicate with one or more networks such as a local area network (LAN), a general wide area network (WAN), and/or a public network (e.g., the Internet) via network adapter 520. As depicted, network adapter 520 communicates with the other components of computer node 512 via bus 518. It should be understood that although not shown, other hardware and/or software components could be used in conjunction with computer node 512. Examples, include, but are not limited to: microcode, device drivers, redundant processing units, external disk drive arrays, RAID systems, tape drives, and data archival storage systems, etc.

In certain embodiments, the computing device 100 and/or the web server 150 each has the architecture of computer node 512.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description provides examples of embodiments of the invention, and variations and substitutions may be made in other embodiments.

What is claimed is:

1. A computer-implemented method, comprising:
   receiving a request for web page resources in response to a web page being downloaded at a connection speed;
   determining that web page performance data is stored for the web page and for the connection speed; and
   in response to determining that a resource loading issue indicator in the web page performance data indicates one of (i) the web page has a resource loading issue and (ii) the resource loading issue indicator is not set:
      retrieving the web page resources to form a bundle of web page resources;
      displaying the web page using the bundle of web page resources;
      determining whether there were one or more rendering updates to the web page after an initial rendering of the web page when using the bundle of web page resources;
      in response to determining that there were one or more rendering updates, setting the resource loading issue indicator to indicate that the web page does not have the resource loading issue; and
      in response to determining that there were no rendering updates, setting the resource loading issue indicator to indicate that the web page has the resource loading issue.

2. The computer-implemented method of claim 1, further comprising:
   in response to determining that the resource loading issue indicator in the web page performance data indicates that the web page does not have the resource loading issue, processing the request for the web page resources without bundling the web page resources.

3. The computer-implemented method of claim 1, further comprising:
   displaying an indication that the web page is being downloaded while the web page resources are being retrieved.

4. The computer-implemented method of claim 1, further comprising:
   setting the resource loading issue indicator based on the stored web performance data.

5. The computer-implemented method of claim 1, wherein the web page performance data includes a web page identifier of the web page, the connection speed, system settings of a browser displaying the web page, web page resource data of the web page resources, loading time of the web page, and the resource loading issue indicator.

6. A computer program product, the computer program product comprising a computer readable storage medium having program code embodied therewith, the program code executable by at least one processor to perform:
   receiving a request for web page resources in response to a web page being downloaded at a connection speed;
   determining that web page performance data is stored for the web page and for the connection speed; and
   in response to determining that a resource loading issue indicator in the web page performance data indicates one of (i) the web page has a resource loading issue and (ii) the resource loading issue indicator is not set:
      retrieving the web page resources to form a bundle of web page resources;
      displaying the web page using the bundle of web page resources;

determining whether there were one or more rendering updates to the web page after an initial rendering of the web page when using the bundle of web page resources;

in response to determining that there were one or more rendering updates, setting the resource loading issue indicator to indicate that the web page does not have the resource loading issue; and in response to determining that there were no rendering updates, setting the resource loading issue indicator to indicate that the web page has the resource loading issue.

7. The computer program product of claim 6, wherein the program code is executable by the at least one processor to perform:

in response to determining that the resource loading issue indicator in the web page performance data indicates that the web page does not have the resource loading issue, processing the request for the web page resources without bundling the web page resources.

8. The computer program product of claim 6, wherein the program code is executable by the at least one processor to perform:

displaying an indication that the web page is being downloaded while the web page resources are being retrieved.

9. The computer program product of claim 6, wherein the program code is executable by the at least one processor to perform:

setting the resource loading issue indicator based on the stored web performance data.

10. The computer program product of claim 6, wherein the web page performance data includes a web page identifier of the web page, the connection speed, system settings of a browser displaying the web page, web page resource data of the web page resources, loading time of the web page, and the resource loading issue indicator.

11. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

receiving a request for web page resources in response to a web page being downloaded at a connection speed;

determining that web page performance data is stored for the web page and for the connection speed; and in response to determining that a resource loading issue indicator in the web page performance data indicates one of (i) the web page has a resource loading issue and (ii) the resource loading issue indicator is not set:

retrieving the web page resources to form a bundle of web page resources;

displaying the web page using the bundle of web page resources;

determining whether there were one or more rendering updates to the web page after an initial rendering of the web page when using the bundle of web page resources;

in response to determining that there were one or more rendering updates, setting the resource loading issue indicator to indicate that the web page does not have the resource loading issue; and in response to determining that there were no rendering updates, setting the resource loading issue indicator to indicate that the web page has the resource loading issue.

12. The computer system of claim 11, wherein the operations further comprise:

in response to determining that the resource loading issue indicator in the web page performance data indicates that the web page does not have the resource loading issue, processing the request for the web page resources without bundling the web page resources.

13. The computer system of claim 11, wherein the operations further comprise:

displaying an indication that the web page is being downloaded while the web page resources are being retrieved.

14. The computer system of claim 11, wherein the operations further comprise:

setting the resource loading issue indicator based on the stored web performance data.

15. The computer system of claim 11, wherein the web page performance data includes a web page identifier of the web page, the connection speed, system settings of a browser displaying the web page, web page resource data of the web page resources, loading time of the web page, and the resource loading issue indicator.

16. The computer-implemented method of claim 1, further comprising:

determining that the web page performance data is not stored; and storing the web page performance data for use in determining whether to bundle web page resources for a subsequent request of the web page at the connection speed.

17. The computer program product of claim 6, wherein the program code is executable by the at least one processor to perform:

determining that the web page performance data is not stored; and storing the web page performance data for use in determining whether to bundle web page resources for a subsequent request of the web page at the connection speed.

18. The computer system of claim 11, wherein the operations further comprise:

determining that the web page performance data is not stored; and storing the web page performance data for use in determining whether to bundle web page resources for a subsequent request of the web page at the connection speed.

* * * * *